(12) United States Patent
Brodsky et al.

(10) Patent No.: US 9,077,882 B2
(45) Date of Patent: Jul. 7, 2015

(54) RELEVANT IMAGE DETECTION IN A CAMERA, RECORDER, OR VIDEO STREAMING DEVICE

(75) Inventors: Tomas Brodsky, Croton on Hudson, NY (US); Mi-Suen Lee, New York, NY (US); Carolyn Christine Ramsey, Pleasantville, NY (US); Yun-Ting Lin, White Plains, NY (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 2548 days.

(21) Appl. No.: 11/397,780

(22) Filed: Apr. 4, 2006

(65) Prior Publication Data

US 2007/0024707 A1 Feb. 1, 2007

Related U.S. Application Data

(60) Provisional application No. 60/668,446, filed on Apr. 5, 2005.

(51) Int. Cl.
| *H04N 7/12* | (2006.01) |
| *H04N 11/02* | (2006.01) |
| *H04N 5/232* | (2006.01) |
| *G08B 13/196* | (2006.01) |
| *G11B 27/28* | (2006.01) |
| *G06K 9/00* | (2006.01) |

(52) U.S. Cl.
CPC ............ *H04N 5/232* (2013.01); *G06K 9/00771* (2013.01); *G08B 13/1961* (2013.01); *G08B 13/19645* (2013.01); *G08B 13/19663* (2013.01); *G08B 13/19669* (2013.01); *G11B 27/28* (2013.01)

(58) Field of Classification Search
CPC ........... G06K 9/00771; G08B 13/1961; G08B 13/19645; G08B 13/19663; G08B 13/1669; G11B 27/28; H04N 5/232
USPC ...................................... 375/240.12; 348/143
See application file for complete search history.

(56) References Cited

U.S. PATENT DOCUMENTS

| 4,249,207 | A | 2/1981 | Harman et al. |
| 4,931,868 | A | 6/1990 | Kadar |
| 5,602,585 | A | 2/1997 | Dickinson et al. |
| 5,721,692 | A | 2/1998 | Nagaya et al. |
| 6,130,707 | A | 10/2000 | Koller et al. |
| 6,727,938 | B1 | 4/2004 | Randall |
| 7,015,806 | B2 * | 3/2006 | Naidoo et al. ................ 340/531 |
| 7,023,913 | B1 * | 4/2006 | Monroe ................... 375/240.01 |
| 2004/0075738 | A1 * | 4/2004 | Burke et al. .................. 348/143 |
| 2004/0155958 | A1 | 8/2004 | Lee |
| 2005/0058323 | A1 | 3/2005 | Brodsky et al. |
| 2005/0111696 | A1 * | 5/2005 | Baer ............................. 382/103 |
| 2005/0157169 | A1 | 7/2005 | Brodsky et al. |

* cited by examiner

*Primary Examiner* — Anner Holder
(74) *Attorney, Agent, or Firm* — Husch Blackwell LLP

(57) ABSTRACT

The filtering tasks that are conventionally applied in a video monitoring application, to distinguish images that may be relevant to the application, are distributed to the image source, or near-source devices. Source devices, such as cameras and playback devices, and near-source devices, such as video concentrators and streaming devices, are configured to include video processing tools that can be used to pre-filter the image data to identify frames or segments of frames that include image information that is likely to be relevant to the receiving video monitoring application. In this manner, the receiving processor need not spend time and resources processing images that are pre-determined to be irrelevant to the receiving application.

47 Claims, 2 Drawing Sheets

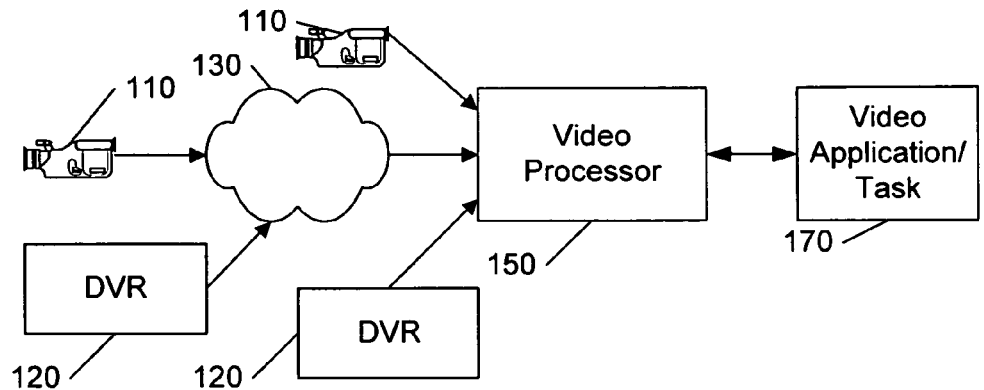
FIG. 1A [Prior Art]
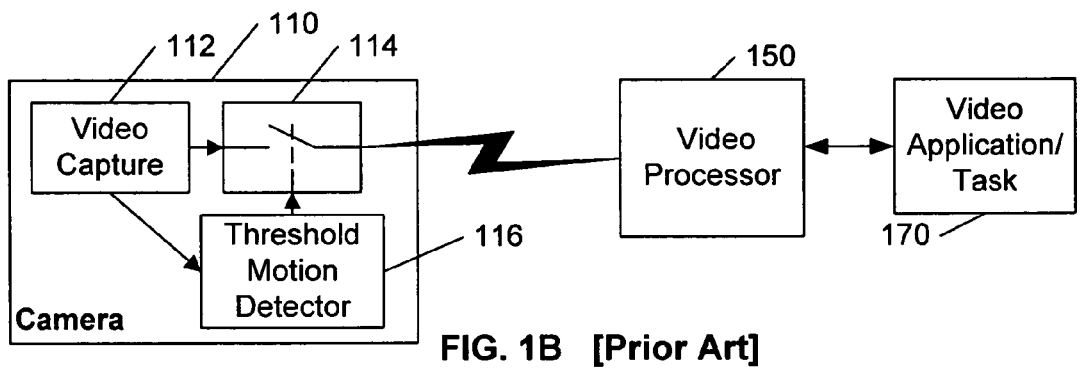
FIG. 1B [Prior Art]
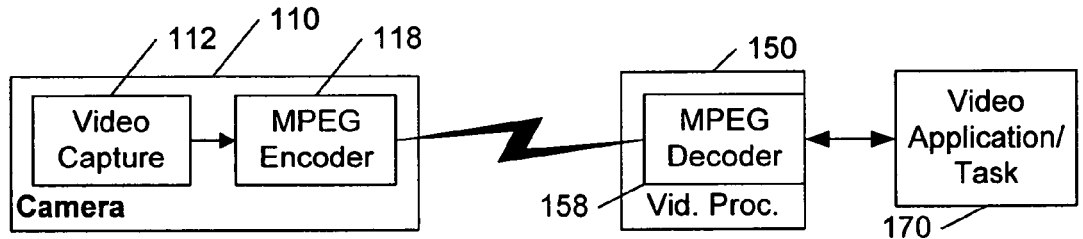
FIG. 1C [Prior Art]
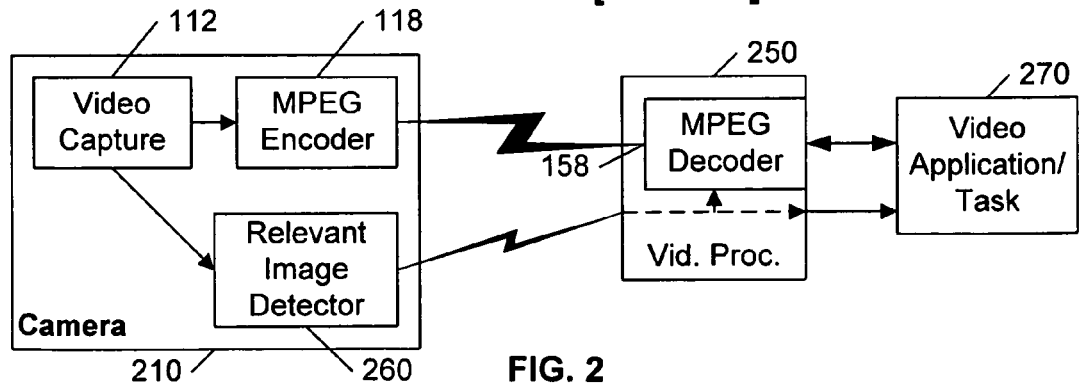
FIG. 2

RELEVANT IMAGE DETECTION IN A CAMERA, RECORDER, OR VIDEO STREAMING DEVICE

This application claims the benefit of U.S. Provisional Patent Application 60/668,446, filed 5 Apr. 2005.

BACKGROUND AND SUMMARY OF THE INVENTION

This invention relates to the field of video systems, and in particular to video input devices that include processes for identifying motion in a video image that is relevant to a given video processing task.

The application of video image processing to varieties of tasks continues to grow. Such applications include, for example, video surveillance, inventory control, traffic management, and so on.

FIG. 1 illustrates a typical image-based system. A video processor 150 receives video image data from a variety of image sources 110, 120. The image source may be, for example, a video camera 110 that provides 'live' images, or a video recorder 120 that provides previously captured images. The sources 110, 120 may be connected directly to the processor 150, or via a network 130, or a combination of both.

The video processor 150 provides image information to an application/task 170 that performs a given function based on the image information. The application 170 may be, for example, a surveillance system that processes the image information to identify situations that warrant an alarm; or, it may be an application that counts people or objects that enter and exit portals; or, it may be a 'passive' system that merely stores select images for subsequent retrieval. Generally speaking, the application 170 identifies 'events' based on image information, and initiates select action based on these events.

As the complexity of video monitoring systems increases, techniques have been developed to facilitate the efficient transmission of video images. U.S. Pat. No. 5,602,585, "METHOD AND SYSTEM FOR CAMERA WITH MOTION DETECTION", issued 11 Feb. 1997 to Dickinson et al., and incorporated by reference herein, teaches the use of a motion detector within a camera to selectively couple image data to a video processor, specifically, a video recorder. The camera is initially placed in a differential mode, wherein changes to the image are provided to the motion detector; when the amount of changes/motion exceeds a given threshold, the camera is placed in full-video mode, wherein the camera is coupled to the recorder, and full images are provided from the camera. After a predetermined duration, the camera is again placed in the differential mode, and decoupled from the recorder.

FIG. 1B illustrates a block diagram of a Dickinson-like technique in the context of this invention. The camera 110 includes a video capture component 112 that sequentially captures images, and a motion detector 116 that determines whether the amount of change/motion in the sequence exceeds a given threshold. The motion detector controls a switch 114 that selectively couples the video images from the video capture component 112 to the output of the camera, based on whether the threshold is exceeded. In this manner, only images that exhibit at least a minimum amount of change/motion are communicated to the video processor 150. This technique is particularly effective for minimizing traffic on a limited bandwidth video network that may be coupled to a plurality of video sources, such as illustrated in FIG. 1A. That is, if each of the cameras 110 and the DVR 120 of FIG. 1A are configured to only transmit changes that exceed a given threshold to the processor 150, the bandwidth of the channel used to route the video from each source 110, 120 to the video processor can be substantially reduced, compared to a continuous video stream from each of the sources 110, 120.

As digital processing techniques advance, the need for a Dickinson-like technique to minimize bandwidth requirements is diminished, as illustrated in FIG. 1C. In this example system, the camera 110 includes an MPEG encoder 118, so that the output stream from the camera 110 is an MPEG-encoded stream. As is known in the art, the MPEG format is inherently a differential format, wherein only the changes to regularly communicated reference images are transmitted. As such, if there is no change between images, no additional 'change frames' need be communicated. Further, the bandwidth used to communicate each change-frame will be dependent upon the amount of change. That is, minor changes consume minor amounts of bandwidth, whereas fuller or more complex changes consume substantially more bandwidth. One of ordinary skill in the art will recognize that Dickinson's threshold-based gating could also be applied to the system of FIG. 1C, although the relative increase in efficiency, compared to its application to full-stream video would be substantially decreased.

Returning to FIG. 1A, as video monitoring systems increase in complexity, the 'scalability' of the video processor 150 and video application 170 becomes a limiting factor in the expansion of the video monitoring capabilities to include multiple video sources 110, 120. Even with the use of motion-only filtering, as illustrated in FIG. 1B, or differential imaging, as illustrated in FIG. 1C, the video processor 150 and/or the application 170 are still required to process each frame from each source 110, 120 that reports motion, and, in the case of FIG. 1C, this processing necessarily includes decoding the received MPEG frames to produce the image frames.

A further problem with the motion-based filtering approaches of FIGS. 1B and 1C relates to the indiscriminate nature of motion-detection. In an outdoor scene, for example, the random movement of leaves and branches of a tree can produce a measure of perceived motion that equals or exceeds the measure of motion of a person entering or leaving a scene. In an indoor scene, movements in 'permitted' areas, such as the area near bank tellers produce a measure of motion that is indistinguishable from a measure of motion produced by movements in 'protected' areas, such as the area near the bank's safe. That is, conventional motion-based filtering techniques are fairly ineffective in environments that are expected to exhibit movements that are irrelevant to the task at hand, and are generally only effective in limited environments, such as systems that monitor the interior of bank safes, or office or factory environments during 'off-hours', and so on.

An object of this invention is to provide a video monitoring system that is well structured for multiple-camera operations. A further object of this invention is to provide a video monitoring system that is well suited for environments that exhibit activity/motion that is generally unrelated to the video monitoring application. A further object of this invention is to provide a video monitoring system that reduces the amount of video processing or video analysis required to perform a given task. A further object of this invention is to further reduce the bandwidth requirements for video monitoring systems.

These objects, and others, are achieved by distributing the video processing typically performed in a video monitoring system among the components of the system. Specifically, the filtering tasks that are conventionally applied in a video monitoring application, to identify activity in the images that may be relevant to the monitoring task, are distributed to the image source, or near-source devices. Source devices, such as cameras and playback devices, and near-source devices, such as video concentrators and streaming devices, are configured to include video processing tools that can be used to pre-filter the image data to identify frames or segments of frames that include information that is likely to be relevant to the receiving video monitoring application. In this manner, the receiving processor need not spend time and resources processing images that are pre-determined to be irrelevant to the receiving application.

BRIEF DESCRIPTION OF THE DRAWINGS

The invention is explained in further detail, and by way of example, with reference to the accompanying drawings wherein:

FIGS. 1A-1C illustrates an example block diagram of prior art video monitoring systems.

FIG. 2 illustrates an example block diagram of an embodiment of a video monitoring system in accordance with this invention.

Throughout the drawings, the same reference numerals indicate similar or corresponding features or functions. The drawings are included for illustrative purposes and are not intended to limit the scope of the invention.

DETAILED DESCRIPTION

Figure 3A:
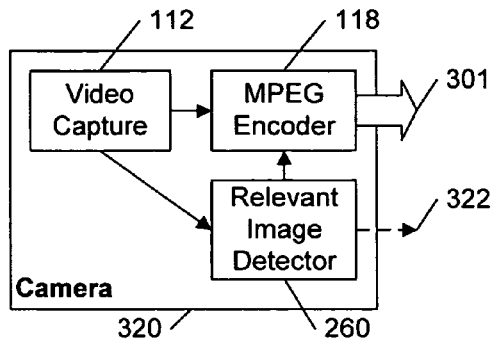
FIGS. 3A-3C illustrate other example block diagrams of embodiments of a video monitoring system in accordance with this invention.

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail. In like manner, the examples are provided using labels and terminology that are easily recognized, to facilitate understanding. For example, the terms "MPEG", "NTSC", and "PAL" are used as paradigms for digital and analog encoding technologies, although the principles of this invention are not limited to these examples. Similarly, the use of a particular term, such as MPEG, is intended to include any and all of the derivatives and variations, such as MPEG1, MPEG2, MPEG4, MJPEG, H.263, H.264, and so on.

With advances in technology and miniaturization, video source devices, such as digital cameras for consumer use, are being provided with advanced video processing capabilities, including, for example, image stabilization, white level balancing, and so on. This invention is premised on the observation that this same technology can be applied for other video processing tasks, such as distinguishing images that may be relevant or irrelevant to a given video processing application.

When such tasks are performed at the source devices, the video processing application can exhibit a substantial increase in performance. Consider, for example, an application that conventionally spends half its time identifying images of interest, and half its time determining whether an actionable event is indicated in the identified images of interest. A ten camera system in a conventional system incurs a 10× increase in processing time, while a ten camera system with cameras that identify images of interest will only incur a 5× increase in processing time. A further increase in performance will be achieved if the application spends a larger proportion of time identifying images of interest, as is typically the case.

FIG. 2 illustrates an example embodiment of a camera 210 in accordance with this invention. In this embodiment, the camera 210 includes an image detector 260 that is configured to filter the image data captured by the video capture component 112, to identify images that are potentially relevant to the video application 270. More specifically, the image detector 260 applies one or more filters that are configured to eliminate images that are determined to be irrelevant to application 270 from further consideration. If an image is not eliminated as being irrelevant, it is identified as being potentially relevant. This identification of potentially relevant images is communicated to the video processor 250 and application 270; either or both of these components 250, 270 can thereafter ignore any images that are not identified as being potentially relevant to the application 270. In this manner, the resources of the processor 250 and application 270 can be focused on application-specific tasks, such as determining whether the image indicates that an alarm should be sounded in a surveillance system, whether a count should be incremented in an asset control system, whether a traffic light sequence should be changed in a traffic control system, and so on.

In accordance with this invention, the relevant-image detector 260 is configured to filter the images based on one or more image characteristics, and not merely whether a threshold amount of change/movement occurs in the image. That is, for example, the fact that a given number of pixels have changed, or the fact that a magnitude of a cumulative measure of change/movement occurs in the image provides no information concerning the content of the image. Conversely, the fact that, for example, a contiguous cluster of pixels exhibits a change which indicates that the image may contain an object corresponding to this contiguous cluster. In like manner, the fact that a contiguous cluster of pixels of a given size exhibits a flesh tone indicates that the image may contain a facial image. In general terms, a relevant-image detector is configured to determine whether the image contains characteristics associated with one or more target objects, such as size, shape, color, texture, velocity, orientation, rigidity, height, altitude, and so on.

The following are examples of techniques for identifying relevant images. U.S. Pat. No. 4,931,868, "METHOD AND APPARATUS FOR DETECTING INNOVATIONS IN A SCENE", issued 5 Jun. 1990 to Ivan Kadar, and incorporated by reference herein, assesses changes to groups of pixels, and is able to distinguish motions of objects from random changes in pixel values, and is also able to identify changes of texture in a scene, even when there is no actual object movement in the scene. U.S. Pat. No. 4,249,207, "PERIMETER SURVEILLANCE SYSTEM", issued 3 Feb. 1981 to Harman et al., and incorporated herein, partitions an image into variable sized cells, corresponding to an area that a person would occupy in the image, depending upon the distance of the imaged region from the camera. Each cell is subsequently assessed to determine whether the image contains a person-sized object within the cell. U.S. Pat. No. 6,130,707, "VIDEO MOTION DETECTOR WITH GLOBAL INSENSITIVITY", issued 10 Oct. 2000 to Koller et al., and incorporated by reference herein, determines an overall measure of changes in an image, such as caused by a change of illumination, and uses this measure to adjust a threshold value that is used to distinguish changes in object-size sub-areas of the image. U.S. Pat. No. 5,721,692, "MOVING OBJECT DETECTION APPARATUS", issued 24 Feb. 1998 to Nagaya et al., and incorporated by reference herein, detects the direction and velocity of objects in an image by partitioning the image into narrow slits and monitoring the change of intensity of the slit over time, to identify objects passing through the slit. USPA 2004/0155958, "USER ASSISTED CUSTOMIZATION OF AUTOMATED VIDEO SURVEILLANCE SYSTEMS", filed 9 May 2003 for Mi-Suen Lee, and incorporated by reference herein, allows a user to define a variety of possible target objects, such as people, vehicles, and so on, and associated sets of characteristics associated with each target type.

In addition to, or in lieu of, these object-characteristic filtering techniques, the relevant image detector 260 may also include filters that distinguish relevant from irrelevant images based on where in the image an object or activity occurs. U.S. Pat. No. 6,727,938, "SECURITY SYSTEM WITH MASKABLE MOTION DETECTION AND CAMERA WITH AN ADJUSTABLE FIELD OF VIEW", issued 27 Apr. 2004 to Jennifer L. Randall, and incorporated by reference herein, teaches the use of one or more masks to block regions of an image within which the occurrence of activity is irrelevant to the application. USPA 2005/0157169, "OBJECT BLOCKING ZONES TO REDUCE FALSE ALARMS IN VIDEO SURVEILLANCE SYSTEMS", filed 20 Oct. 2004 for Brodsky et al., and incorporated by reference herein, teaches filtering the occurrence activities that originate within defined regions, but not filtering the activities/objects that traverse the regions.

Many other techniques are commonly used to identify or filter images based on characteristics of the image and include, for example, techniques that distinguish/filter reflections from actual objects, as taught, for example in USPA 2005/0058323, "SYSTEM AND METHOD FOR COUNTING CARS AT NIGHT", filed 5 Feb. 2004 for Tomas Brodsky, and incorporated by reference herein.

FIG. 2 illustrates that the relevant image detector 260 providing its output, the identification of relevant images, along a separate communication path to the video processor 250. One of ordinary skill in the art will recognize that the identification of relevant images could also be communicated on the same channel as the video data, using any of a variety of multiplexing and/or encoding techniques. Optionally, the detector 260 may be configured to send a separate mask that identifies the region or regions in the image that caused the image to be determined to be relevant, or an identification of such a region or regions, such as the coordinates of a bounding box that includes the regions upon which the relevance determination was based. The detector 260 may also be configured to initiate the encoding and/or communication of alternative planes of the image that may facilitate the further processing and analysis of the relevant images. In like manner, if the source device 210 or the processor 250 includes an image memory, the occurrence of a relevant image may also trigger the playback or recording of images preceding the relevant image, to facilitate a determination of the cause of the relevant image.

The video processor 250 and application 270 are configured to process the images that are identified by the source device 210 as being potentially relevant to the application 270. The processor 250 may be configured for example, to record all of the received images, or only those identified as being potentially relevant, or it may be configured to record all of the received images along with all of the received indications of whether each image is potentially relevant. The processor 250 may also be configured to record all images, but at differing resolutions, depending upon the relevancy determination. Similarly, the processor 250 may be configured to decode and provide potentially relevant images to the application 270, or it may provide all received images to the application 270, and the application 270 can be configured to only process the relevant images. The processor 250 and application 270 may also be configured to process 'reference' images and the like, as required, regardless of their relevant/irrelevant classification, to enable the processing of subsequent relevant image frames that rely on these reference images.

Depending upon the amount and type of relevance-filtering applied at the source 210, any of a variety of subsequent actions and processes may occur at the processor 250 and/or source 270. In a straightforward application wherein all of the target-determining filtering is performed at the source device 210, the application 270 may merely be configured to provide an alarm notification upon receipt of a relevant image. In other embodiments, the application 270 may be configured to apply additional filtering to determine whether the image, or images, that are identified as being potentially relevant include alarm-producing activities. In a preferred embodiment, such alarm indications include an indication of where, in the image or in real space, the alarm-producing activity is occurring.

Additionally, the alarm indication may include messages or commands that are communicated to the source device 210 or other source devices, to optimize the information-gathering and/or filtering tasks. For example, one or more of the source devices may be controlled to pan, tilt, or zoom to provide a better view of the area of activity. In an image tracking application, the application 270 may identify a distinguishing feature in an object of interest, and communicate directives to the relevant-image detectors 260 in one or more of the source devices to further filter the images. That is, for example, if the detector 260 in the original source device identifies a person with a red hat as a target object, detectors 260 in other source devices may be configured to identify only objects with red hat characteristics (e.g. a set of predominantly red pixels at an upper region of a set of object pixels) as relevant, or, to add a further indication, such as 'very relevant' to any identified relevant image that also include objects with red hat characteristics.

Conceptually, the relevant image detector 260 and application 270 form a hierarchy of filtering and/or reasoning engines, wherein the relevant image detector applies image-reasoning techniques to distinguish relevant images, and the application 270 applies event-reasoning techniques to distinguish events requiring subsequent actions. Obviously, the amount of image-reasoning that can be applied at the detector 260 is dependent upon the resources available at the source 210, and any further image-reasoning that is required will be performed at the processor 250 and/or the application 270.

Preferably, the relevant image detector 260 contains a core group of target identifying modules with programmable parameters, such as a size or shape module that can be programmed to identify images that contain moving objects of at least a minimum given size or shape relevant, the minimum size and shape being dependent upon the particular application 270. For example, a vehicular traffic control application would specify a larger minimum size for potential target objects than a luggage conveyance system's minimum size target object. A combination of parameters may also be provided, such as height, length, or area parameters, along with a definition of the Boolean operations (and, or, not, greater-than, less-than, etc.) to be applied to these parameters to identify relevant or irrelevant images. In a more sophisticated embodiment, the relevant image detector 260 may include a more powerful and/or specialized processor, such as a digital signal processor (DSP), that can be programmed for executing other algorithms, such as those discussed above, for identifying objects, recognizing features, masking regions of the image, and so on. The detector 260 may be dynamically reprogrammed or reconfigured, based on ongoing activities, as discussed above with regard to the 'look for a person with a red hat' example. Depending upon the particular embodiment, the relevant image detector 260 may be preconfigured with common algorithms and default parameters that are selectively enabled when the video monitoring system is installed, and/or, the parameter values, custom programs, and enablement settings may be programmed during a set-up or maintenance procedure after installation, and/or, the operator of the monitoring system may be provided with programming, enabling, and parameter setting options on a continuing or as-needed basis.

Figure 3B:
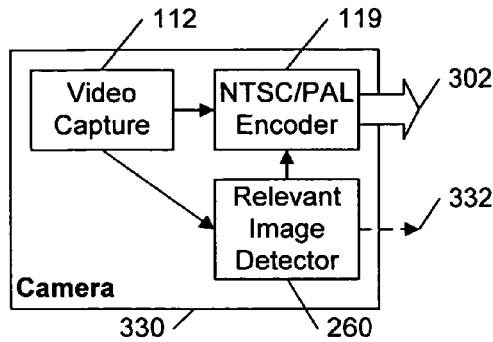
Figure 3C:
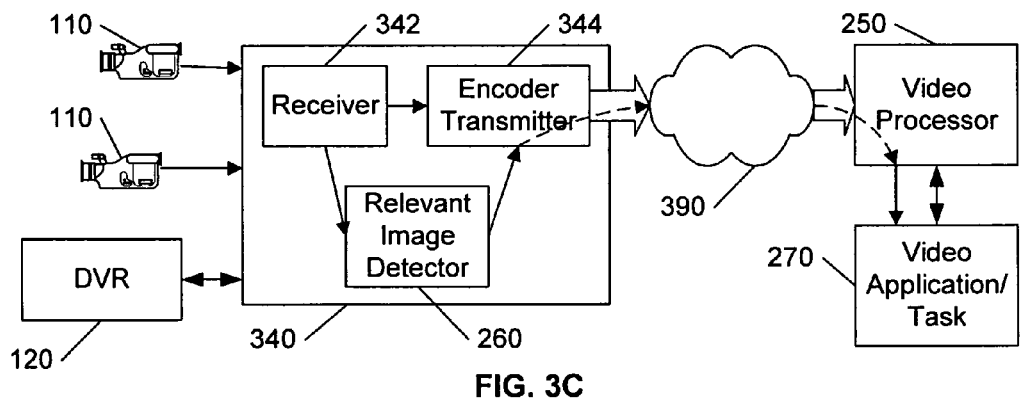

FIGS. 3A-3C illustrate a variety of other configurations of source devices in accordance with this invention. In each of these examples, as in the above example, particular features or options are presented in the context of the particular example. However, one of ordinary skill in the art will recognize that such features are not necessarily limited to the particular embodiment that is used to provide context, and may be applied to other embodiments as well.

As illustrated in FIG. 3A, the source device 320 includes an image detector 260 that is configured to control the MPEG encoder 118, or other transmission component, to inhibit the encoding/transmission of irrelevant images, thereby implicitly communicating the relevant/irrelevant determination from the relevant image detector 260 by only communicating potentially relevant images 301. Optionally, the detector 260 may also be configured to provide an explicit indication 322 as well, or ancillary information such as the aforementioned 'very relevant' indication when particular features or activities are detected.

Additionally, or alternatively, the image detector 260 may be configured to control the type of information that is communicated based on the relevant/irrelevant determination. For example, the detector 260 may be configured to direct the encoder 118 to send a full image reference frame when a relevant image is first detected, to assure that the receiving system is in-sync for subsequent images. Similarly, it may control the encoder 118 to modify the encoding parameters, such as the frame rate or resolution, or it may add ancillary information to the content of the output images 301, including, for example, an indication of the segment of the image that triggered the relevancy determination, such as a bounding box. Other controls and modifications to the encoding of images based on a determination of the potential relevancy of the images will be evident to one of ordinary skill in the art in view of this disclosure.

FIG. 3B illustrates a source device 330 having a similar configuration to device 320 in FIG. 3A, except that the output images 302 are encoded using an analog encoder 119, such as an NTSC or PAL encoder. The detector 260 may directly control the encoder to enable or disable encodings, or add ancillary information to the encoding, using, for example, techniques similar to those used for adding closed-caption overlays or embedded teletext. As illustrated, an explicit indication 332 may also be provided, to facilitate the processing of the identified relevant images.

In an embodiment of an encoding and/or transmission controlling use of the image detector 260, such as illustrated in FIGS. 3A and 3B, the image detector 260 or its associated control element is preferably configured to enable the continuous encoding/transmission of images for a given period of time after the detection of a relevant image. In this manner, the receiving system receives subsequent images regardless of whether the relevance-indicating conditions continue to be exhibited in the subsequent images, thereby ongoing images to facilitate an ongoing assessment of the situation.

FIG. 3C illustrates an embodiment of this invention in a video concentrator or video streamer 340 that is configured to provide an interface between one or more source devices 110, 120 and a communications network 390, such as a telephone network, an Internet network, a local network, a private network, a point-to-point network, and so on. The streamer 340 includes a receiver 342 that is configured to receive images from one or more of the sources 110, 120, and an encoder/transmitter 344 that is configured to forward the images to a subsequent video processing system 250, 270 via the network 390. In this embodiment, a relevant image detector 260 processes the images from the one or more sources 110, 120 to identify potentially relevant images, using one or more of the techniques discussed above, or other image characterization/reasoning techniques available in the art. As in the previous examples, the detector 260 may merely communicate its relevancy determinations, or it may use these determinations to control one or more aspects of the video streamer 340, or a combination of both. In a preferred embodiment, to optimize bandwidth utilization, the detector 260 is configured to control the encoding/transmission 344 of the images based on the relevancy determination, either by enabling or disabling the transmission of each image, or by controlling one or more of the encoding parameters, such as the frame rate, resolution, or others.

The streamer 340 is also preferably configured to optionally record the images, using, for example, a video DVR 120 or other storage device. In a preferred embodiment, the relevancy determination from the detector 260 is also used to control the recording of the images, either by enabling or disabling the recording of each image, or by controlling one or more of the encoding parameters, such as the frame rate, resolution, or others. As would be evident to one of ordinary skill in the art, the functionality of the streamer 340 may be embedded in such a DVR, or other recording device, thereby eliminating the need to provide a separate component to perform the streamer-with-RID processing.

Figure 4:
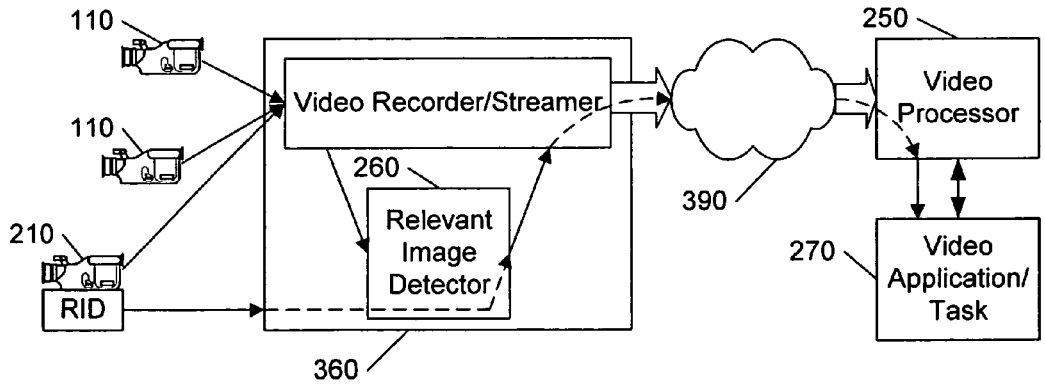
FIG. 4 illustrates an example block diagram of a hybrid embodiment that includes conventional video devices, and video devices in accordance with this invention.

FIG. 4 illustrates a hybrid configuration of conventional devices and relevant-image-detecting devices in accordance with this invention, as might be embodied in a video recording or video streaming device 360. In this embodiment, the device 360 is configured to receive images from either conventional image sources 110 or from image sources 210 that include a relevant image detector (RID). A relevant image detector 260 is configured to distinguish potentially relevant images within the received images, in combination with the information provided by any of the remote RIDs. If the remote RID in the source 210 and the local detector 260 are configured to apply the same criteria for identifying relevant images, the local detector 260 does not process the images from the source 210, and merely acts as a conduit for the relevancy information, and uses the relevancy determination in the same manner as it would had the relevancy been determined by the detector 260. If the local detector 260 applies a higher level of filtering than the remote RID at the source 210, the detector 260 is configured to only process the images from the source 210 that have been identified as being potentially relevant by the lower level filters at the remote RID. If the local detector 260 and remote RID at the source 210 have disjoint filtering criteria, the local detector 260 processes the images from the source 210 in the same manner as it does the images from conventional sources 110, and optionally communicates or records both relevancy determinations to facilitate further processing. In a preferred embodiment, the device 360 includes a user interface that allows a user to establish the relationships between the remote and local filters (same, hierarchical, disjoint), and to establish the reporting scheme (one, both, and, or) for disjoint relevancy determinations.

By providing hybrid and/or hierarchical configurations, the use of the principles of this invention can provide solutions that easily scale to accommodate large and complex multi-camera video-monitoring systems.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements, and can include an immeasurable number of elements.

We claim:

1. A video monitoring system comprising:
a video capture element that is configured to provide a plurality of video images, and
a corresponding image detector that is configured to:
receive the video images, and
determine a relevancy of each image by filtering each image based on one or more image characteristics of the image; and
a remote video processing system that receives the plurality of images and the relevancy of each image from the corresponding image detector, the remote video processing system is configured to process the plurality of images based on the determined relevancy of each image and to dynamically reprogram or reconfigure the corresponding image detector to identify a distinguishing feature by further filtering an object of interest detected by the remote video processing system.

2. The camera of claim 1, including an image encoder that is configured to communicate an encoding of the video images to a receiving system that includes the video monitoring application.

3. The camera of claim 2, wherein the image encoder includes a digital video encoder that is configured to provide differential image encoding.

4. The camera of claim 2, wherein the image encoder includes at least one of: an NTSC encoder and a PAL encoder.

5. The camera of claim 2, wherein the relevant image detector is configured to control one or more aspects of the image encoder.

6. The camera of claim 2, wherein the relevant image detector is configured to provide an indication of the relevancy of each image, and the image encoder is configured to communicate the indication to the receiving system.

7. The camera of claim 2, wherein the relevant image detector is configured to communicate an indication of the relevancy to the receiving system.

8. The camera of claim 1, wherein the one or more image characteristics include at least one of: a size, a shape, a color, a height, and an altitude.

9. The camera of claim 8, wherein the one or more image characteristics include at least one of: a texture, a velocity, an orientation, a rigidity, a length, and a height.

10. The camera of claim 1, wherein the relevant image detector is configured to receive parameter values corresponding to the one or more image characteristics that facilitate determining the relevancy.

11. The camera of claim 10, wherein the relevant image detector is configured to transmit other parameter values to other relevant image detectors to facilitate determining subsequent relevancies in other images.

12. The camera of claim 1, wherein the relevant image detector is configured to determine the relevancy based on changes at each of at least a predefined number of contiguous pixels.

13. The camera of claim 1, wherein the relevant image detector is configured to determine the relevancy based on changes at each of a predefined arrangement of contiguous pixels.

14. The camera of claim 1, wherein the relevant image detector is configured to determine the relevancy based on changes within each of a plurality of regions within each image.

15. The camera of claim 1, wherein the relevant image detector is configured to determine the relevancy based on changes within at least one region of each image that is smaller in area than the image.

16. The camera of claim 1, including a recorder that is configured to record the video images.

17. The camera of claim 16, wherein the relevant image detector is configured to control one or more parameters of the recorder based on the relevancy.

18. The camera of claim 16, wherein the relevant image detector is configured to selectively enable the recorder based on the relevancy.

19. The camera of claim 1, wherein the relevant image detector includes a programmable processor that is configured to facilitate modification of the one or more image characteristics.

20. The camera of claim 1, wherein the relevant image detector includes a programmable processor that is configured to facilitate modification of a program used to determine the relevancy.

21. The camera of claim 20, wherein the programmable processor includes a digital signal processor.

22. A video streaming system that includes:
a receiver that is configured to receive video images from one or more video sources,
an encoder that is configured to transmit the video images to a receiving system that includes a remote video monitoring application, and
a relevant image detector that is configured to:
receive the video images, and
determine a relevancy of each image by filtering each image based on one or more image characteristics of the image, based on one or more characteristics associated with target objects of the video monitoring application; and
the remote video monitoring application that receives the plurality of images and the relevancy of each image from the relevant image detector, the remote video monitoring application is configured to process the plurality of images based on the relevancy of each image and to dynamically reprogram or reconfigure the relevant image detector to identify a distinguishing feature by further filtering of target objects detected by the remote video monitoring application.

23. The system of claim 22, wherein the relevant image detector includes a programmable processor that is configured to facilitate modification of the one or more image characteristics.

24. The system of claim 22, wherein the relevant image detector includes a programmable processor that is configured to facilitate modification of a program used to determine the relevancy.

25. The system of claim 24, wherein the programmable processor includes a digital signal processor.

26. The system of claim 22, wherein the one or more image characteristics include at least one of: a size, a shape, a color, a height, and an altitude.

27. The system of claim 26, wherein the one or more image characteristics include at least one of: a texture, a velocity, an orientation, a rigidity, a length, and a height.

28. The system of claim 22, wherein the encoder includes a digital video encoder that is configured to provide differential image encoding.

29. The system of claim 22, wherein the encoder includes at least one of: an NTSC encoder and a PAL encoder.

30. The system of claim 22, wherein the relevant image detector is configured to control one or more aspects of the encoder.

31. The system of claim 22, wherein the relevant image detector is configured to provide an indication of the relevancy of each image, and the encoder is configured to communicate the indication to the receiving system.

32. The system of claim 22, wherein the relevant image detector is configured to receive parameter values corresponding to the one or more image characteristics that facilitate determining the relevancy.

33. The system of claim 32, wherein the relevant image detector is configured to transmit other parameter values to other relevant image detectors to facilitate determining subsequent relevancies in other images.

34. The system of claim 22, wherein the relevant image detector is configured to determine the relevancy based on changes at each of at least a predefined number of contiguous pixels.

35. The system of claim 34, wherein the relevant image detector is configured to determine the relevancy based on changes at each of a predefined arrangement of contiguous pixels.

36. The system of claim 22, wherein the relevant image detector is configured to determine the relevancy based on changes within each of a plurality of regions within each image.

37. The system of claim 22, wherein the relevant image detector is configured to determine the relevancy based on changes within at least one region of each image that is smaller in area than the image.

38. The system of claim 22, including a recorder that is configured to record the video images.

39. The system of claim 38, wherein the relevant image detector is configured to control one or more parameters of the recorder based on the relevancy.

40. The system of claim 38, wherein the relevant image detector is configured to selectively enable the recorder based on the relevancy.

41. A method including:
receiving a plurality of images from a video capture element;
filtering each of the plurality of images based on one or more image characteristics of the image;
identifying irrelevant images from the plurality of images based on the filtering;
identifying a relevancy of each of the plurality of images based on the identification of irrelevant images;
processing a plurality of images to identify a relevancy of each image based on characteristics associated with target objects of a video monitoring application,
communicating the plurality of images and the relevancy of each image to a remote video processing system that is configured to process the images of the plurality of images based on the relevancy of each image; and
the remote video processing system dynamically reprogramming or reconfiguring the relevant image detector to identify a distinguishing feature by further filtering an object of interest detected by the remote video processing system.

42. The method of claim 41, including processing the images of the plurality of images based on the relevancy of each image.

43. The method of claim 41, wherein communicating the plurality of images includes encoding the plurality of images based on the relevancy of one or more of the images.

44. The method of claim 43, wherein encoding the images includes adjusting at least one of the image frame rate and the image resolution based on the relevancy of the one or more images.

45. The method of claim 41, wherein the one or more image characteristics include at least one of: a size, a shape, a color, a height, and an altitude.

46. The method of claim 41, including receiving parameter values corresponding to the one or more image characteristics that facilitate determining the relevancy.

47. The method of claim 41, including recording the images based on the relevancy.

* * * * *